US012808650B2

(12) United States Patent
Lee et al.

(10) Patent No.: US 12,808,650 B2
(45) Date of Patent: Nov. 24, 2026

(54) STRAIN SENSOR, METHOD OF MANUFACTURING STRAIN SENSOR, AND STRAIN MEASURING METHOD USING STRAIN SENSOR

(71) Applicants: Hyundai Motor Company, Seoul (KR); Kia Corporation, Seoul (KR); Research & Business Foundation Sungkyunkwan University, Suwon-Si (KR)

(72) Inventors: Mi Yong Lee, Hwaseong-Si (KR); Seong Hyun Son, Changwon-Si (KR); Moon Young Jung, Suwon-Si (KR); Jun Ho Song, Suwon-Si (KR); Jong Seo Kim, Suwon-Si (KR); Woo Chang Jeong, Suwon-Si (KR); Gwan Mu Lee, Suwon-Si (KR); Dong Seok Suh, Seoul (KR); Feng Wang, Suwon-Si (KR)

(73) Assignees: Hyundai Motor Company, Seoul (KR); Kia Corporation, Seoul (KR); Research & Business Foundation Sungkyunkwan University, Suwon-si (KR)

( * ) Notice: Subject to any disclaimer, the term of this patent is extended or adjusted under 35 U.S.C. 154(b) by 744 days.

(21) Appl. No.: 18/104,627

(22) Filed: Feb. 1, 2023

(65) Prior Publication Data

US 2024/0118071 A1 Apr. 11, 2024

(30) Foreign Application Priority Data

Oct. 6, 2022 (KR) ........................ 10-2022-0127620

(51) Int. Cl.
*G01B 7/16* (2006.01)
*G01L 1/22* (2006.01)
(Continued)

(52) U.S. Cl.
CPC .............. *G01B 7/18* (2013.01); *G01L 1/2206* (2013.01); *G01L 1/2287* (2013.01); *H01B 1/04* (2013.01);
(Continued)

(58) Field of Classification Search
CPC .... G01B 7/18; G01B 7/16; G01L 1/20; G01L 1/2206; G01L 1/2287; G01L 1/22;
(Continued)

(56) References Cited

U.S. PATENT DOCUMENTS 7,594,442 B2 * 9/2009 Kaiserman ............. B60N 2/003 73/763
8,545,792 B2 * 10/2013 Liu ........................ B82Y 40/00 423/447.3

(Continued)

FOREIGN PATENT DOCUMENTS

CN 106637568 A * 5/2017 ............... D02G 3/36
JP 7083996 B2 * 6/2022

(Continued)

*Primary Examiner* — John E Breene
*Assistant Examiner* — Daniel M Quinn
(74) *Attorney, Agent, or Firm* — Banner & Witcoff, Ltd.

(57) ABSTRACT

A strain sensor may have a conductive elastic yarn including a first fiber having a predetermined length and a shape of a fiber yarn and a second fiber having electrical conductivity and a sheet shape. The strain sensor may have a pair of wiring members electrically connected to both ends of the conductive elastic yarn. The conductive elastic yarn, with the second fiber wrapped around the first fiber, is twisted in a coil shape.

6 Claims, 8 Drawing Sheets

(51) Int. Cl.

| | |
|---|---|
| ***H01B 1/04*** | (2006.01) |
| ***H01B 1/06*** | (2006.01) |
| ***H01B 7/08*** | (2006.01) |
| ***H01B 13/00*** | (2006.01) |

(52) U.S. Cl.

CPC ............. *H01B 1/06* (2013.01); *H01B 7/0892* (2013.01); *H01B 13/0016* (2013.01)

(58) Field of Classification Search

CPC ... H01B 1/04; H01B 1/06; H01B 1/24; H01B 7/0892; H01B 13/0016; H01B 13/00; H01B 7/08; D02G 3/32; D02G 3/38; D02G 3/441; D02G 1/022; D02G 3/16; D01H 1/02

USPC ............. 77/360; 57/336; 73/760; 423/445 R, 423/447.3

See application file for complete search history.

(56) References Cited

U.S. PATENT DOCUMENTS

| | | | | |
|---|---|---|---|---|
| 10,900,145 | B2 * | 1/2021 | Kim | D01H 1/02 |
| 2008/0170982 | A1 * | 7/2008 | Zhang | C04B 35/62897 423/447.3 |
| 2009/0282671 | A1 | 11/2009 | Tao et al. | |
| 2012/0090400 | A1 * | 4/2012 | Hatami | E02D 17/202 264/105 |
| 2013/0104665 | A1 * | 5/2013 | Biris | B82Y 30/00 977/734 |
| 2019/0072440 | A1 * | 3/2019 | Menon | D03D 1/0088 |
| 2019/0169770 | A1 * | 6/2019 | Tsukamoto | D02G 3/06 |
| 2020/0072596 | A1 * | 3/2020 | Pang | G01L 1/2287 |

FOREIGN PATENT DOCUMENTS

| | | | | |
|---|---|---|---|---|
| KR | 10-2018-0096141 | A | 8/2018 | |
| KR | 101885130 | B1 * | 8/2018 | D02G 3/441 |
| KR | 1020180096141 | A1 * | 8/2018 | G01B 7/16 |
| KR | 10-2019-0143672 | A | 12/2019 | |
| KR | 102061127 | B1 * | 1/2020 | H01B 19/04 |
| KR | 10-2020-0026707 | A | 3/2020 | |
| KR | 102096318 | B1 * | 4/2020 | D01F 9/12 |
| KR | 10-2020-0072374 | A | 6/2020 | |
| KR | 10-2020-0131539 | A | 11/2020 | |
| KR | 10-2021-0151547 | A | 12/2021 | |
| WO | WO-2020166122 | A1 * | 8/2020 | G01L 1/205 |
| WO | WO-2022080496 | A1 * | 4/2022 | H01B 1/24 |

* cited by examiner

STRAIN SENSOR, METHOD OF MANUFACTURING STRAIN SENSOR, AND STRAIN MEASURING METHOD USING STRAIN SENSOR

CROSS-REFERENCE TO RELATED APPLICATION(S)

This application claims benefit of priority to Korean Patent Application No. 10-2022-0127620 filed on Oct. 6, 2022 in the Korean Intellectual Property Office, the disclosure of which is incorporated herein by reference in its entirety.

TECHNICAL FIELD

The present disclosure relates to a strain sensor, a method of manufacturing a strain sensor, and a strain measuring method using the strain sensor.

BACKGROUND

A load cell is a sensor for measuring force or load, and may comprise a metal material. Load cells are sometimes used on vehicle components, but may have limitations in application to parts undergoing large amount of deformation. As such, load cells may not be able to directly measure force or load experienced by parts such as the vehicle's bushings, engine mount, and bumper stopper, etc. Instead, a load cell is sometimes disposed at another part in contact with and/or peripheral to the part, as opposed to at a surface of the part that undergoes the large amount of deformation, and performs measurement of force or load experienced by the other part.

To avoid the above problem, a piezoelectric sensor may be used. The piezoelectric sensor may be configured to measure a load by using an electricity generated by a piezoelectric element of the piezoelectric sensor in response to external pressure. However, the piezoelectric sensor may only measure load data and may not measure displacement (e.g., deformation of the part under load).

Deformation of the component may be measured using a strain sensor or a strain gauge. The strain sensor or strain gauge may comprise a metal material. A metal-based strain sensor or strain gauge may measure a small strain within 1%, but may not be able to measure strain in the case of parts that undergo large amount of deformation.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

Systems, apparatuses, and methods are described for a strain sensor and manufacturing and using said strain sensor. A strain sensor may comprise a conductive elastic yarn and a pair of wiring members electrically connected to both ends of the conductive elastic yarn. The conductive elastic yarn may comprise a first fiber comprising a fiber yarn, and a second fiber having electrical conductivity and a sheet shape. The conductive elastic yarn may be twisted in a coil shape.

A method of manufacturing a strain sensor may comprise fixing both ends of a first fiber, tensioning the first fiber having both ends fixed, arranging at least one ply of a second fiber around the tensioned first fiber, wherein the second fiber forms a sheet and is electrically conductive, twisting the first fiber and the second fiber to produce a conductive elastic yarn, and coupling wires to both ends of the conductive elastic yarn.

A method of measuring strain may comprise attaching a conductive elastic yarn to an object and measuring a resistance of the conductive elastic yarn during strain of the object. The conductive elastic yarn comprises used in the method may comprise a first fiber comprising a fiber yarn, and a second fiber having electrical conductivity and a sheet shape, wherein the second fiber is wrapped around the first fiber.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
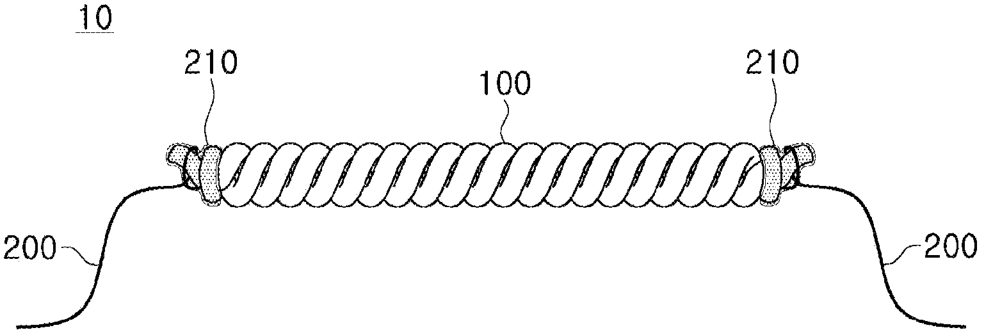
FIG. 1 is a schematic diagram of a strain sensor according to an example.

Since the present disclosure can have various changes and can have various embodiments, specific example are illustrated in the drawings and described in detail. However, this is not intended to limit the present disclosure to a specific embodiment, it should be understood to include all modifications, equivalents and substitutes included in the spirit and scope of the present disclosure.

Terms such as first, second, etc. may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The term "and/or" includes a combination of a plurality of related listed items or any of a plurality of related listed items.

The terms used in the present application are only used to describe specific example, and are not intended to limit the present disclosure. The singular expression includes the plural expression unless the context clearly dictates otherwise. In the present application, terms such as "comprise" or "have" are intended to designate that a feature, number, step, operation, component, part, or combination thereof described in the specification exists, but one or more other features may also be included. It is to be understood that it does not preclude the possibility of the presence or addition of numbers, steps, operations, components, parts, or combinations thereof.

Unless defined otherwise, all terms used herein, including technical or scientific terms, have the same meaning as commonly understood by one of ordinary skill in the art to which this disclosure belongs. Terms such as those defined in a commonly used dictionary should be interpreted as having a meaning consistent with the meaning in the context of the related art, and should not be interpreted in an ideal or excessively formal meaning unless explicitly defined in the present application.

Hereinafter, with reference to the accompanying drawings, an embodiment will be described in more detail.

Figure 2:
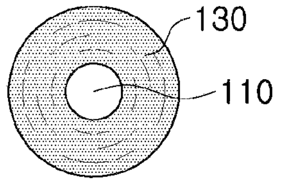
FIG. 2 is a cross-sectional view of a conductive elastic yarn according to an example.

FIG. 1 is a schematic diagram of a strain sensor 10 according to an example, and FIG. 2 is a cross-sectional view of a conductive elastic yarn according to an example.

The strain sensor 10 may comprise a conductive elastic yarn 100 and a wiring member 200. In this case, strain refers to the degree of deformation that occurs in an object by an external force, and the strain sensor may be configured to attached to the surface of a machine or structure so as to measure the deformation occurring on the surface, even for minute dimensions. In addition, a change in strain may be measured by detecting a change in resistance value of the strain sensor, where the change is according to a minute deformation of the strain sensor. The change in resistance value may be detected using a Wheatstone bridge circuit or another means of measuring resistance (a Wheatstone bridge will be discussed in the following, but another resistance measurement circuit or other means may be used).

The conductive elastic yarn 100 has electrical conductivity and may be a fibrous structure having a shape of a coil that is elastically deformable. The conductive elastic yarn 100 may include a first fiber 110 and a second fiber 130.

In this case, the first fiber 110 may be stretchable in the longitudinal direction, and may be a fiber having excellent elastic recovery ability to return to its original state after being stretched in length. The first fiber 110 may comprise (e.g., be made of primarily and/or entirely) spandex, which is a synthetic fiber formed of an elastic yarn of polyurethane fiber, but is not limited thereto.

The second fiber 130 may be a fiber having excellent electrical properties capable of generating a difference in conductivity (for example, a difference in electrical resistance) even in response to a small deformation. The second fiber 130 may comprise (e.g., be made of entirely and/or primarily) one or more carbon nanotubes (CNTs), but is not limited thereto.

Referring to FIG. 2, in the conductive elastic yarn 100, after disposing the sheet of the second fiber 130 around the first fiber 110, the second fiber 130 may be twisted around the outer peripheral surface of the first fiber 110, approximately centered on the first fiber 110. The process of manufacturing the conductive elastic yarn 100 using the first fiber 110 and the second fiber 130 will be described later with reference to FIG. 3.

The wiring member 200 may electrically connect the strain sensor 10 and a measuring device (not illustrated) and may be configured to transmit an electrical signal according to a change in strain of the conductive elastic yarn 100. The wiring member 200 may be a light metal wiring member 200 having excellent durability and electrical conductivity, and may be electrically connected to both ends of the conductive elastic yarn 100. In this case, the wiring member 200 may include the wiring member 200 formed of platinum (Pt), but is not limited thereto.

Figure 3:
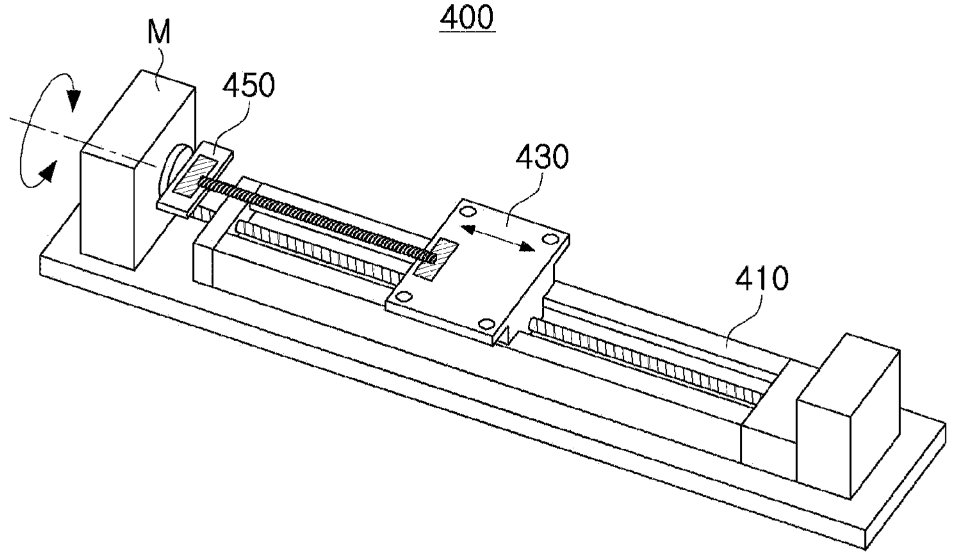
FIG. 3 is a schematic diagram of an apparatus for manufacturing a conductive elastic yarn according to an example.

FIG. 3 is a schematic diagram of an apparatus for manufacturing a conductive elastic yarn according to an example.

The conductive elastic yarn manufacturing apparatus 400 may include a body rail 410, a first fixing part 430, and a second fixing part 450.

The body rail 410 may be extended to have a predetermined length, and may guide the first fixing part 430 to move in a straight direction.

The first fixing part 430 may be a plate having an upper surface on which a workpiece may be fixed, and a lower surface of the first fixing part 430 may be a plate capable of linear motion along the body rail 410 in combination with the body rail 410. The first fixing part 430 may move along the body rail 410 and may have a fixed state at a specific position. The lower surface of the first fixing part 430 may be coupled to the body rail 410 and the guide roller, but is not limited thereto, and may be coupled by various known means capable of linear motion along the body rail 410.

The second fixing part 450 may be fixedly supported on one side of the body rail 410. The second fixing part 450 includes a rotation driving part M, and may rotate together while fixing the workpiece.

For example, one end of the first fiber 110 or the second fiber 130 may be fixed to the first fixing unit 430, and the other end may be fixed to the second fixing unit 450. Since the first fiber 110 or the second fiber 130 is fixed to one side of the second fixing part 450 to which the other end is fixed, the first fixing part 430 is fixed to the body rail 410. The first fiber 110 or the second fiber 130 may be stretched or contracted according to movement along the body rail 410. Since one end of the first fiber 110 and/or the second fiber 130 is fixed to the first fixing unit 430, the first fiber 110 and/or the second fiber 130 may be twisted according to the rotational movement of the second fixing unit 450 to which the other end is coupled. In this case, the rotational motion of the second fixing part 450 and the linear motion of the first fixing part 430 may be performed together.

Figure 4:
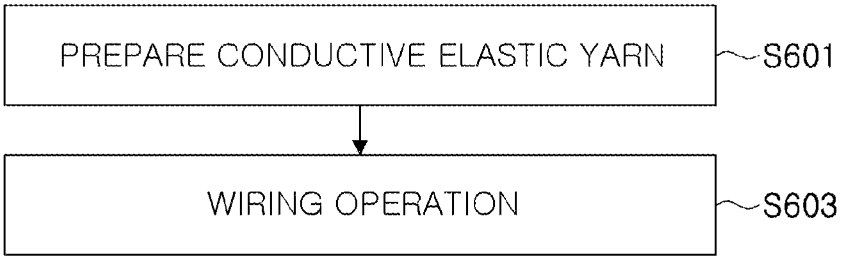
FIG. 4 is a flowchart of manufacturing a strain sensor according to an example.
Figure 5:
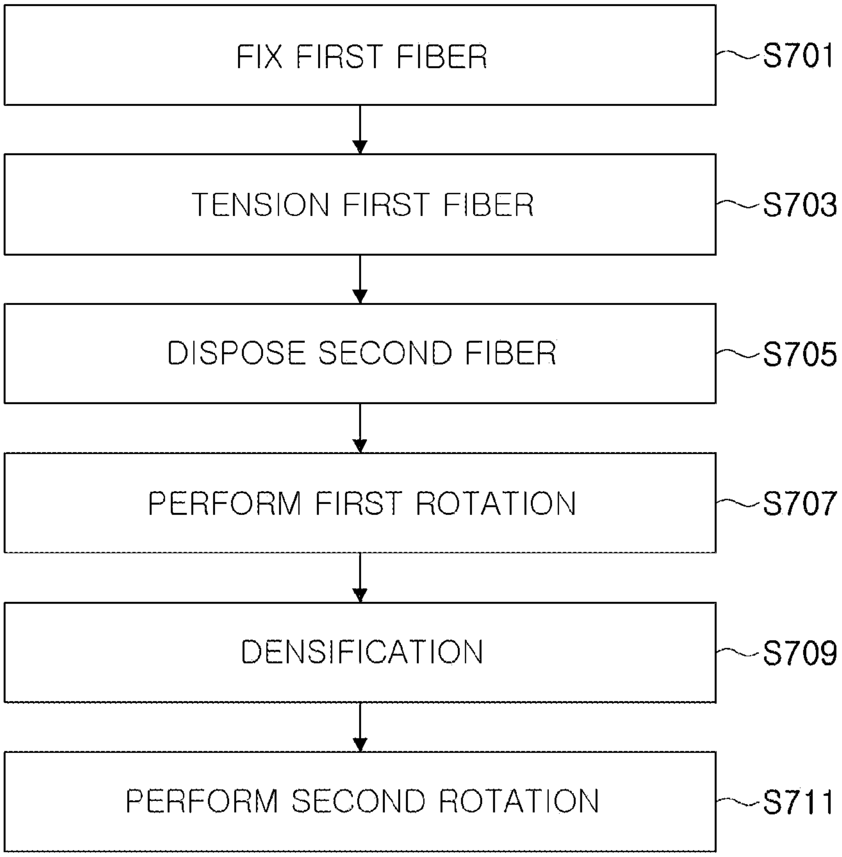
FIG. 5 is a flowchart of manufacturing a conductive elastic yarn of a strain sensor according to an example.
Figure 6:
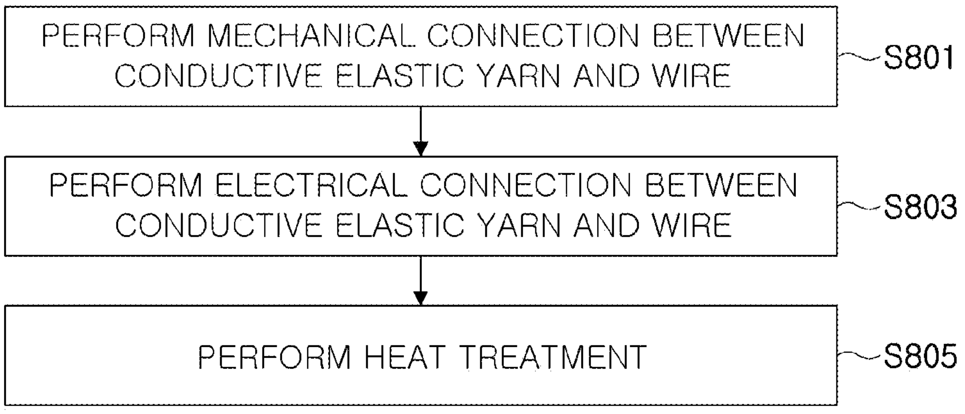
FIG. 6 is a flowchart illustrating a wiring process of a strain sensor according to an example.

FIG. 4 is a flowchart of manufacturing a strain sensor according to an example, FIG. 5 is a flowchart of manufacturing a conductive elastic yarn of a strain sensor according to an example, and FIG. 6 is a flowchart illustrating the wiring process of the strain sensor according to an example.

Referring to FIG. 4, the manufacturing of the strain sensor 10 may comprise preparing the conductive elastic yarn 100 (S601) and a wiring the conductive elastic yarn 100 to a wiring member 200 (S603).

The operation of preparing the conductive elastic yarn 100 of the strain sensor 10 (S601) will be described with reference to FIG. 5.

The first fiber 110 may be fixed to the first fixing part 430 and the second fixing part 450 of the conductive elastic yarn manufacturing apparatus 400 (S701). In detail, one end of the first fiber 110 may be fixed to the first fixing unit 430, and the other end of the first fiber 110 may be fixed to the second fixing unit 450. In this case, the first fiber 110 may have a first length (e.g., about 7 cm) in an untensioned state (a state in which no external force is applied). The first fiber 110 may be fixed to the first fixing part 430 and the second fixing part 450 (e.g., using a carbon tape). In this case, the carbon tape has excellent electrical conductivity and adhesion, such that the first fiber 110 may be stably fixed to the first fixing part 430 and the second fixing part 450. However, the present disclosure is not limited thereto, and various means having electrical conductivity and adhesiveness may be applied.

When the first fiber 110 is fixed to the first fixing part 430 and the second fixing part 450, the first fixing part 430 may be moved to tension the first fiber 110 to a second length (S703). In detail, the first fiber 110 having one end fixed to the second fixing unit 450 may be tensioned by moving the first fixing unit 430 having the other end fixed along the body rail 410. In this case, the first fiber 110 may move the first fixing unit 430 to be stretched to a preset second length (e.g., approximately 35 cm).

In a state in which the first fiber 110 is in tension, the second fiber 130 in the form of a sheet may be disposed on the first fiber 110 (S705). Also, in a state in which the second fiber 130 sheet is disposed, the first fiber 110 and the second fiber 130 may be fixed together to the first fixing unit 430 and the second fixing unit 450. In this case, the first fiber 110 and the second fiber 130, and the first fixing part 430 and the second fixing part 450 may be respectively fixed using a carbon tape.

In this case, the sheet of the second fiber 130 disposed on the first fiber 110 may be disposed in about 5 to 20 layers. The number of layers may be the number of sheets of second fibers 130 disposed on top of the first fibers. As the layer of the second fiber 130 to be disposed increases, both the tensile limit and resistance of the conductive elastic yarn 100 may be lowered. Accordingly, the number of layers of the sheet of the second fiber 130 disposed on the first fiber 110 may be variously modified (e.g., selected) according to the object 20 to which it is to be applied. For example, when the degree of deformation of the object 20 is small, the conductive elastic yarn 100 should be able to confirm a large electrical resistance change even with a small deformation, such that the number of layers of the sheet of the second fiber 130 is relatively large, for example, 20 layers may be placed. In addition, when the degree of deformation of the object 20 is large, the conductive elastic yarn 100 must have a large tensile limit, such that the number of layers of the second fiber 130 sheet is relatively small, for example, 5 layers may be arranged. In other words, by adjusting the number of plies of the second fiber disposed on the first fiber, it is possible to adjust the tensile limit and the electrical resistance according to the deformation of the strain sensor 10, such that the strain sensor 10 may be applied to various objects 20.

In a state in which the first fiber 110 and the second fiber 130 disposed on the first fiber 110 are fixed at both ends to the first fixing part 430 and the second fixing part 450, a first rotation operation of primarily rotating the second fixing part 450 may be performed (S707). In the first rotation operation, by rotating the second fixing part 450, the second fiber 130 is rotated together with the first fiber 110, and the first fiber 110 is rotated around the first fiber 110. The second fiber 130 in the form of a sheet may be twisted along the outer circumferential surface of the first fiber 110. For example, the first fiber 110 and the second fiber 130 may each have one end fixed to the first fixing unit 430, whose rotation may be restricted, and the other end fixed to the second fixing unit 450 may be rotated, the first fiber 110 and the second fiber 130 may be twisted. In this case, the second fixing unit 450 may be rotated at a preset speed (e.g., 42 revolutions per minute (RPM)) by a preset total number of rotations (e.g., approximately 500 times). However, since the preset rotation speed and total number of rotations of the second fixing unit 450 are closely related to the elastic recovery force of the conductive elastic yarn 100, the rotation speed and the total number of rotations of the second fixing unit 450 may be variably set according to the number of layers of the second fiber 130 to be disposed.

After the first rotation operation (S707) is completed, a densification operation for increasing the degree of adhesion between the first fiber 110 and the second fiber 130 may be performed (S709). After the first rotation operation (S607) is completed and the densification solution is sprayed on the twisted first fibers 110 and second fibers 130, they may be dried for a certain period of time (e.g., about 5 minutes). The densification solution is a solution capable of increasing the degree of adhesion between the first fiber 110 and the second fiber 130, and may be ethanol, but is not limited thereto.

After the densification operation (S709) is completed, a second rotation operation may be performed (S711). In an example, in the second rotation operation, unlike the first rotation operation, the first fixing part 430 may move along the body rail 410 together with the rotational movement of the second fixing part 450. In detail, the second fixing unit 450 may be rotated by a preset total number of rotations (e.g., approximately 800 times) at a preset rotation speed (e.g., 42 RPM) like the first rotation operation. Also, the first fixing unit 430 may move toward the second fixing unit 450 at a predetermined speed (e.g., 8.4 mm/min). The moving speed of the first fixing part 430 is not limited thereto, and may be variously selected according to the rotational speed of the second fixing part 450, the total number of rotations, and the number of layers of the second fibers 130.

By performing operations S701 to S711 above, the conductive elastic yarn 100 may be manufactured using the first fiber 110 and the second fiber 130. The conductive elastic yarn 100 manufactured through the above operations S701 to S711 may be approximately 4 cm, but is not limited thereto. The length of the first fiber 110 and the second fiber 130, the total number of rotations of the second fixing part 450, and the number of plies of the second fiber 130 disposed on the first fiber 110 may be variously changed.

The conductive elastic yarn 100 may preferably be stretchable to from 300% to a maximum of 400%. In some cases, when the strain of the conductive elastic yarn 100 exceeds 400% (e.g., repeatedly), there may be reduced elastic recovery force and/or the elastic yarn 100 may not fully recover to the original state upon repeated deformation.

Referring back to FIG. 4, after the conductive elastic yarn 100 is manufactured, a wiring operation may be further performed to use the conductive elastic yarn 100 as the strain sensor 10 (S603). Hereinafter, the wiring operation (S603) will be described with reference to FIG. 6. In the wiring operation (S603), to connect the manufactured conductive elastic yarn 100 and a measuring device for measuring a change in resistance according to a change in strain, a wiring member 200 may be connected to each end of the conductive elastic yarn 100, and the wiring member 200 may be connected to a measuring device.

Referring to FIG. 6, the conductive elastic yarn 100 and the wiring member 200 may be mechanically connected (S801). For example, the wiring members 200 may be bundled and connected to both ends of the conductive elastic yarn 100. In this case, the wiring member 200 may be a wire formed of a light material with excellent durability and electrical conductivity (e.g., platinum material, but is not limited thereto).

The conductive elastic yarn 100 and the wiring member 200 may be electrically connected to each other by bonding with a conductive paste 210 to the bonding portion (S803). In this case, the conductive paste 210 may be a metallic pigment comprising a metal (such as one or more of silver, aluminum, gold, or lead) in a paste state. In one example, a silver (Ag) conductive paste 210 may be used, which may provide a low contact resistance, but the present disclosure is not limited thereto.

After bonding with the conductive paste 210, a heat treatment may be performed to cure the conductive paste 210 (S805). Through the heat treatment, the connection between the conductive elastic yarn 100 and the wiring member 200 may be made more firmly, and the bonding resistance between the conductive elastic yarn 100 and the wiring member 200 may be reduced. In the heat treatment operation (S805), when the conductive elastic yarn 100 and the wiring member 200 are connected using a silver (Ag) conductive paste 210, heat treatment may be performed at 100° C. for about 1 hour, but the present disclosure is not limited thereto.

The strain sensor 10 (e.g., manufactured through the above-described process) may be attached to the object 20 to be measured, and the strain sensor 10 may be connected to a measuring device to measure the strain of the object.

Figure 7A:
FIG. 7A, FIG. 7B, and FIG. 7C are views illustrating an operation of an object to which a strain sensor is attached according to an example.
Figure 7B:
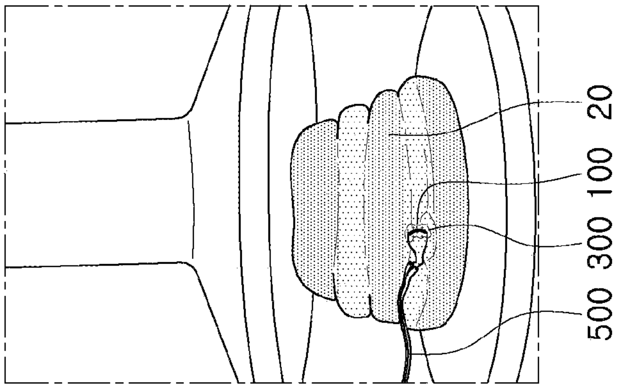
Figure 7C:
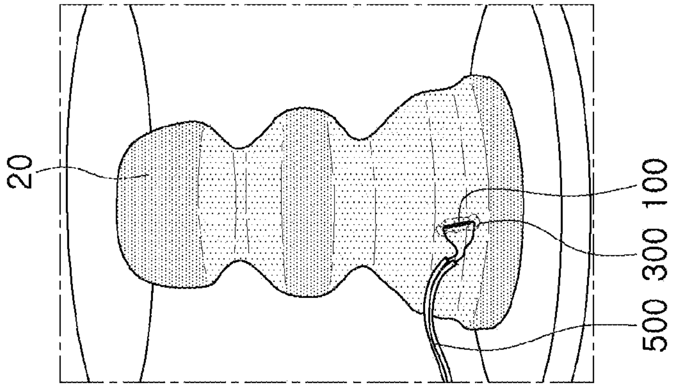

FIGS. 7A, 7B, and 7C are views illustrating an operation of an object to which the strain sensor 10 is attached according to an example.

Referring to FIG. 7A, the strain sensor 10 may be connected to a measuring device connection part 500 through the wiring member 200. The strain sensor 10 connected to the measuring instrument connection part 500 may be attached to the object 20 (e.g., using an adhesive). In detail, the conductive elastic yarn 100 of the strain sensor 10 may be attached to the surface of the object 20 by disposing it substantially parallel to the deformation direction of the object 20 (e.g., an expected deformation direction). In addition, the strain sensor 10 attached to the surface of the object 20 may be coated with a coating agent 300 on the surface of the object 20 including the strain sensor 10 to prevent contact with external contaminants such as dust or foreign substances. In this case, the coating agent 300 may be an epoxy or silicone-based coating agent 300, but is not limited thereto.

FIGS. 7B and 7C are views illustrating that the object 20 is compressed and returned to its original state while the strain sensor 10 is attached according to an example application. As exemplarily illustrated in FIG. 7B, when the object 20 is compressed, the strain sensor may also be contracted. In addition, as exemplarily illustrated in FIG. 7C, when the object 20 is restored to its original state, the strain sensor may also be restored to its original state. The strain sensor 10 according to an example of this disclosure, unlike the strain sensor formed of a metal material of the prior art, has excellent tensile allowable length and elastic recovery, as illustrated in FIGS. 7B to 7C. The present strain sensor 10 is capable of measuring the strain of the object 20 with a large degree of strain.

The method for measuring the strain of the object 20 may comprise using a measuring instrument in which the strain is replaced by the strain sensor 10 that is viewed from the strain gauge using a Wheatstone bridge and/or a strain gauge. In detail, the strain sensor 10 attached to the surface of the object 20 may be connected to a measuring device including a Wheatstone bridge. When the object 20 is deformed by an external force, a change in strain of the object 20 may be measured by sensing resistance that changes due to the length of the strain sensor 10 stretching or contracting with the object 20.

For example, when the strain sensor 10 is stretched, the cross-sectional area may be reduced and the electrical resistance may be increased. Conversely, when the strain sensor 10 contracts, the length is reduced and the cross-sectional area is increased, such that the electrical resistance may be reduced. Accordingly, a change in the resistance of the strain sensor 10 that is extended or contracted together with the object 20 changes the voltage or current of the Wheatstone bridge, and based on the change in the voltage or current of the Wheatstone bridge, the object (20) may be measured.

Also, by using the strain sensor 10, data of a load and strain acting on the object 20 may be measured. A relationship between load and strain may be analyzed based on the measured data. Through the relationship between the load and the strain, another load acting on the object 20 may be determined from strain measured from the strain sensor 10 attached to the object 20. However, the present disclosure is not limited thereto, and various known methods for measuring the applied pressure or load using the strain sensor 10 may be applied.

Hereinafter, the characteristics of the strain sensor 10 according to an example will be described with reference to FIGS. 8 to 11.

Figure 8:
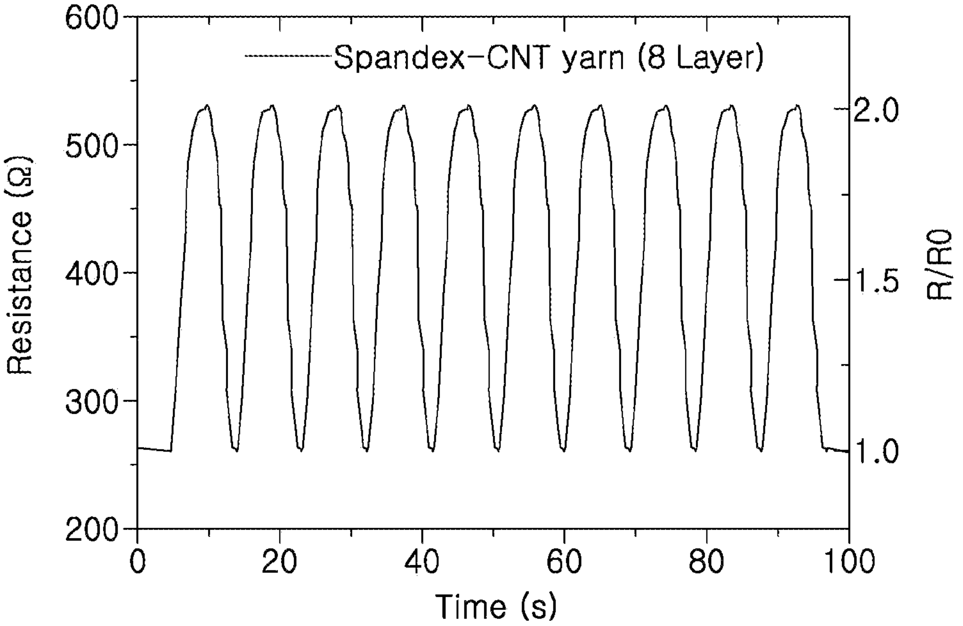
FIG. 8 is a graph illustrating changes in length and resistance according to repeated tension and contraction of a strain sensor according to an example.
Figure 9A:
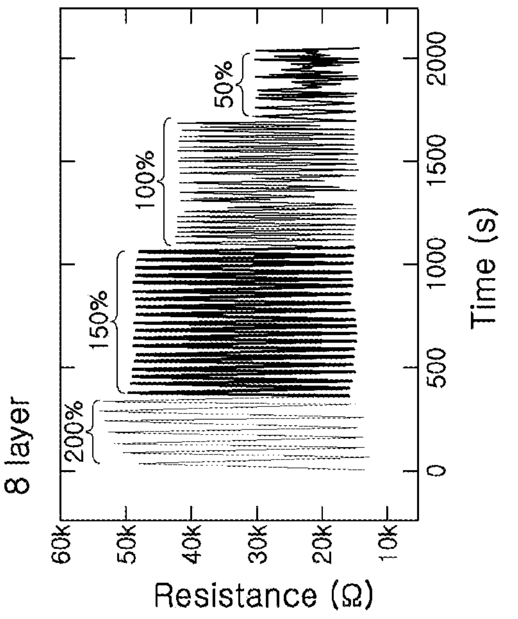
FIG. 9A, FIG. 9B, FIG. 9C, and FIG. 9D are graphs illustrating a change in resistance of a strain sensor according to various examples.
Figure 9B:
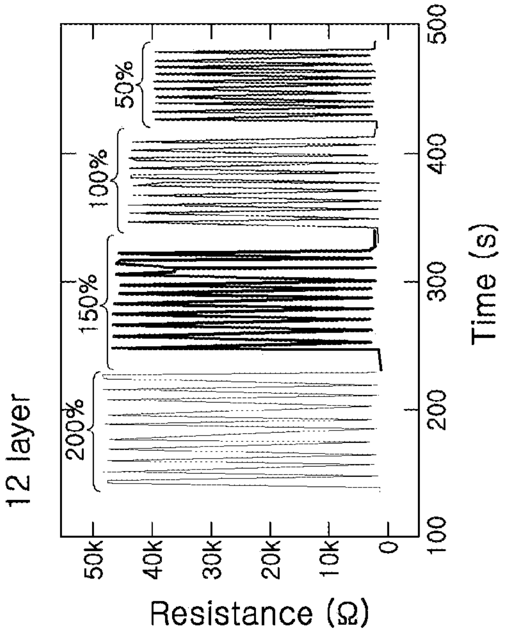
Figure 9C:
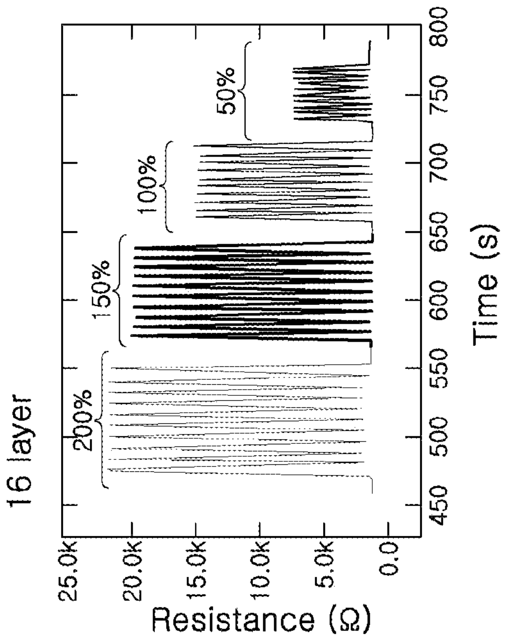
Figure 9D:
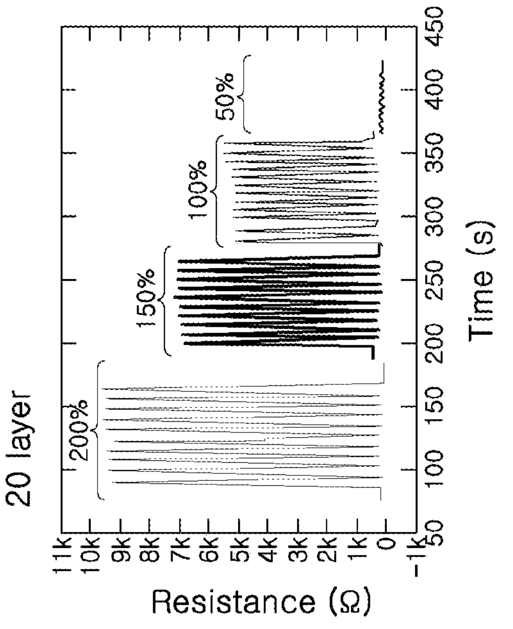

FIG. 8 is a graph illustrating a relative length (length R/unstrained length R0) and resistance of an exemplary strain sensor 10 subject to repeated tension and contraction. FIGS. 9A, 9B, 9C, and 9D show graphs of resistance in various example a strain sensors 10 subject to various repeated levels of tension and contraction (percentages of linear strain).

FIG. 8 shows measurements of a change in resistance of the strain sensor 10 is subject to repeating tension and contraction of the strain sensor 10 from 100% (unstrained) to 200% (strain to 2× linear length). The resistance of the strain sensor 10 when there is no strain (R/R0=1.0) was measured around 260 ohms, and the resistance when the strain of the length of the sensor 10 was doubled (R/R0=2.0) is around 520 ohms. R/R0=1.0 indicates there is no change in the length of the conductive elastic yarn 100 of the strain sensor 10, and R/R0=2.0 indicates the length of the conductive elastic yarn 100 is stretched to twice the unstrained length. Referring to FIG. 8, repeatedly stretching the conductive elastic yarn 100 of the strain sensor 10 results in corresponding changes in the resistance. In addition, it can be seen that the strain sensor 10 maintains a consistent change in resistance even with repeated changes.

In FIGS. 9A, 9B, 9C and 9D, similar data to FIG. 8 is shown, for conductive elastic yarns 100 having different numbers of layers of the second fiber 130 around the first fiber 110 are 8, 12, 16, and 20 ply, respectively. A change in resistance may be observed when the strain [100% (R−R0)/R0] is repeatedly changed to 50%, 100%, 150%, and 200%. It can be seen from FIG. 9A to FIG. 9D that the range of resistance generated changed with the applied strain. For example, it can be seen that the greater the number of layers in which the second fiber is disposed during the manufacturing of the strain sensor 10, the lower the resistance value of the strain sensor 10.

In addition, it can be seen that, when the same strain was applied, in each of FIGS. 9A to 9D, the resistance was also repeatedly changed in a consistent range in response to the magnitude of the strain. For example, regardless of the number of layers, durability and output reliability of the strain sensor 10 against repeated tension and contraction was confirmed.

For example, as the number of layers of the second fiber 130 to be disposed increases, the resistance of the conductive elastic yarn 100 may be lowered, and the resistance value of the strain sensor 10 may be adjusted by adjusting the number of layers of the second fiber. Therefore, by adjusting the number of plies of the second fiber disposed on the first fiber, the electrical resistance according to the deformation of the strain sensor 10 may be adjusted, such that the strain sensor 10 may be manufactured by considering the expected strain rate of the object 20 and a desired range of resistances to measure.

Figure 10:
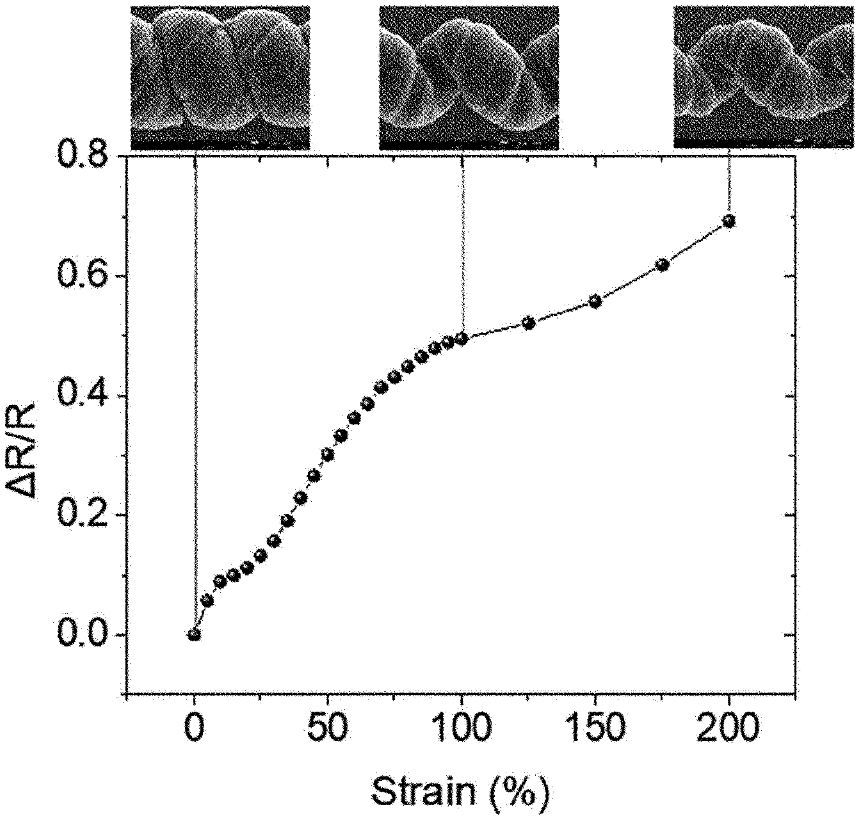
FIG. 10 is a view illustrating changes in cross-section and resistance according to strain of a strain sensor according to an example.

Referring to FIG. 10, it can be seen that as the strain increases, the cross-sectional change rate also increases. In addition, looking at a scanning electron microscope (SEM) image of the conductive elastic yarn 100 of the strain sensor 10 at the top of the graph, it can be seen that the cross-section decreases as the strain increases. In this case, it can be seen that as the length of the strain sensor 10 increases, the cross-sectional area decreases and the resistance increases. In other words, it may be confirmed that the strain sensor 10 according to an embodiment changes according to Equation 1 below, which is a general expression for calculating resistance.

$$R = \rho\frac{L}{A} \qquad \text{[Equation 1]}$$

In this case, R is resistance, ρ is resistivity, L is a length, and A may mean a cross-sectional area.

Figure 11:
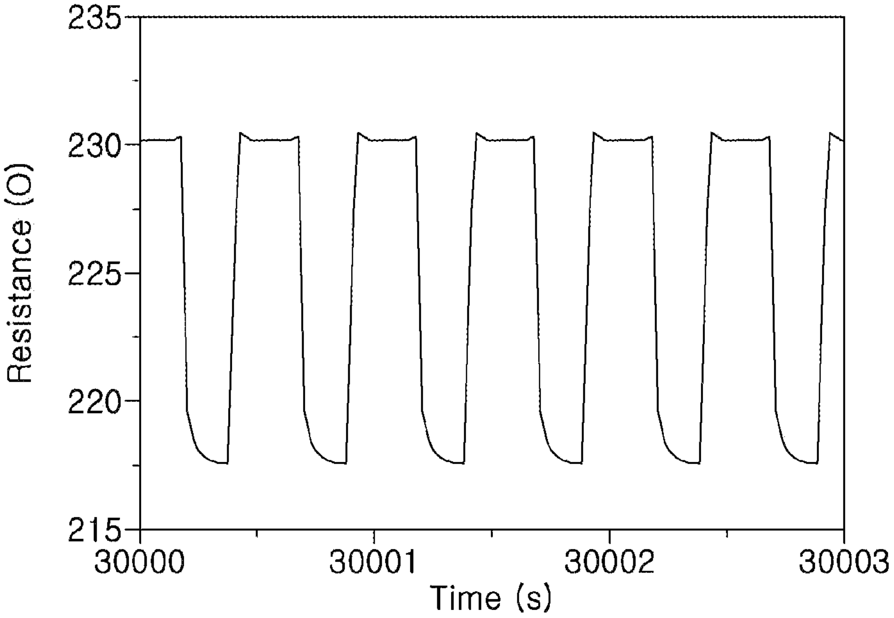
FIG. 11 is a graph illustrating a change in resistance of a strain sensor according to an example according to repeated compression and tension.
Figure 12:
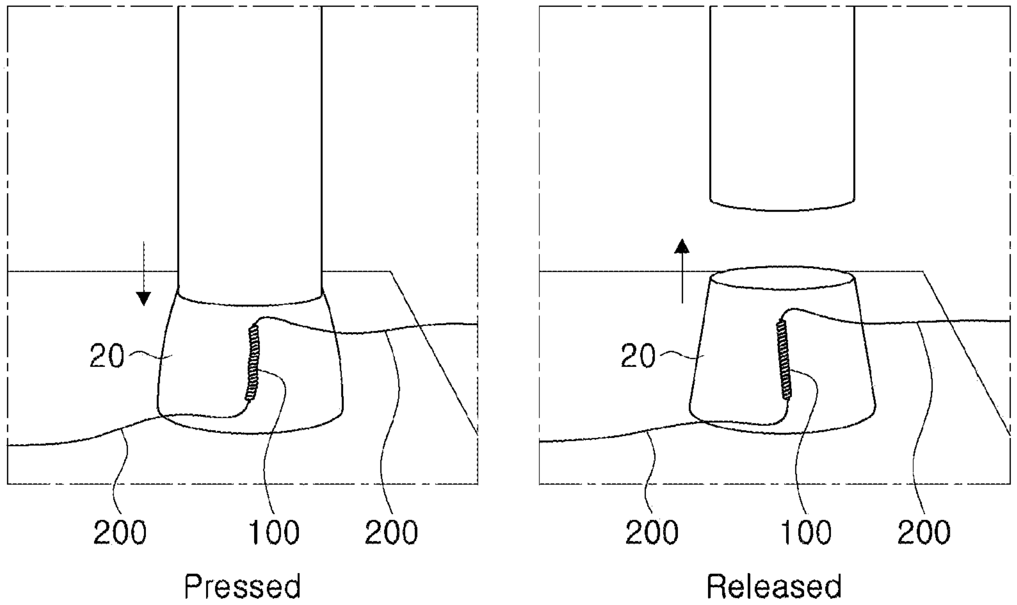
FIG. 12 is a schematic diagram of a compression tension device for repeatedly measuring elastic restoring force of a strain sensor according to an embodiment.

Referring to FIG. 11, it can be seen that the elastic recovery rate of the strain sensor 10 according to an embodiment is excellent. FIG. 11 is a graph illustrating the results of repeated tensile and compression tests for about 8 hours through the tensile compression test apparatus illustrated in FIG. 12. Since tensile and compression tests were performed about twice per second, tension and compression were repeatedly performed approximately 60000 times for 8 hours. It can be seen that a constant change is maintained even over 60000 tensile and compression tests. This consistency demonstrates excellent the elastic recovery force of the strain sensor 10 according to the tested example.

The strain sensor 10 according to an example described above may be applied to the object 20 to which substantial deformation occurs. The strain sensor 10 may advantageously be able to measure the strain change by being directly attached the object 20 using an adhesive. In addition, the strain or load may be measured of an object 20 having a high strain, such as a vehicle seat or bumper stopper, as well as an object 20 having a small strain, such as a metal body, because the conductive elastic yarn has excellent elastic recovery. In addition, by changing the number of plies of the second fiber 130 disposed on the first fiber 110 to adjust the resistance range of the strain sensor 10, there is an advantage that the strain sensor 10 optimized for use on an object 20 in light of an expected strain experienced by the object 20.

As set forth above, according to an example of the present disclosure, a strain of an object undergoing a large amount of deformation, such as a rubber elastic body, may be precisely measured.

According to an example, a strain may be measured by directly attaching a strain sensor to a bushing, a mount, tire parts, a bumper stopper or the like of a vehicle, and accordingly, the strain may be measured more precisely even for parts that undergo large amount of deformation.

An aspect of the present disclosure is to provide a strain sensor for precisely measuring strain of an object having a large amount of deformation, such as a rubber elastic body.

An aspect of the present disclosure is to provide a method of manufacturing a strain sensor capable of precisely measuring strain of an object in which deformation occurs greatly, such as a rubber elastic body in a vehicle.

According to an aspect of the present disclosure, a strain sensor includes a conductive elastic yarn including a first fiber having a predetermined length and having the shape of a fiber yarn and a second fiber having electrical conductivity and a fiber sheet shape; and a pair of wiring members electrically connected to both ends of the conductive elastic yarn. The conductive elastic yarn is wrapped around the first fiber and the second fiber is twisted in a coil shape.

The conductive elastic yarn may be manufactured in the form of a coil by twisting in a state in which at least one layer of the second fiber is disposed around the first fiber.

The first fiber may be spandex, and the second fiber may be a carbon nanotube.

The conductive elastic yarn may have a property of being restored to an initial state in a tensioned state to a value selected from 150 to 400% of an initial state.

The conductive elastic yarn, the number of layers of the second fiber may be selectable in consideration of the electrical resistance value generated according to the strain (strain).

The conductive elastic yarn and the wiring member may be electrically connected using a conductive paste.

The conductive elastic yarn and the wiring member may be heat-treated while being electrically connected using a conductive paste.

According to an aspect of the present disclosure, a method of manufacturing a strain sensor includes a first fixing operation of fixing both ends of the first fiber; a tensioning operation of tensioning the first fiber having both ends fixed; a second fixing operation of arranging at least one ply of second fibers in the form of a sheet on the tensioned first fibers, and fixing both ends of the second fibers to the first fibers; a rotating operation of twisting the first fiber and the second fiber to produce a conductive elastic yarn; and a wiring operation of respectively coupling a wiring member to both ends of the conductive elastic yarn.

In the first rotating operation and the second rotating operation, one end of the first fiber and the second fiber may be rotated in a state in which rotation of the other end of the first fiber and the second fiber is restricted, and the second rotation operation may further include performing in a state in which rotation of the other ends of the first and second fibers is restricted, and moving the other non-rotating ends of the first and second fibers toward one end of the first fiber and the second fiber.

The moving speed of the other end of the first fiber and the second fiber may be determined based on at least one of: a rotation speed of one end of the first fiber and the second fiber, the number of layers of the second fiber, and/or a total number of rotations.

In the densification operation, a second rotation operation may be performed after a predetermined drying time has elapsed so that the applied densification solution may be dried.

The wiring operation may include mechanically connecting the conductive elastic yarn and the wiring member, and electrically connecting the conductive elastic yarn and the wiring member using a conductive paste.

The wiring operation may further include heat-treating the conductive elastic yarn in a state in which the wiring member is electrically connected.

In the second fixing operation, the operation of selecting the number of plies of the second fiber in consideration of an electrical resistance value generated according to a strain may be further included.

According to an aspect of the present disclosure, a method of measuring strain using the strain sensor described above includes an attachment operation of attaching the strain sensor to an object; a connection operation of connecting the wiring member and the measuring device; and a measurement operation of measuring the strain of the object based on a change in resistance of the strain sensor.

In the attaching operation, the longitudinal direction of the conductive elastic yarn may be attached by being arranged in parallel with a direction in which the object is stretched or contracted.

The attaching operation may further include applying a coating agent that prevents the strain sensor from coming into contact with an external contamination source.

The object may include at least one of a bumper stopper, a mount, or a tire (e.g., of a vehicle).

While examples have been described above, it will be apparent to those skilled in the art that modifications and variations could be made without departing from the scope of the present disclosure, as defined by the appended claims.

What is claimed is:

1. A method of manufacturing a strain sensor, comprising:
- fixing both ends of a first fiber;
- tensioning the first fiber having both ends fixed;
- arranging at least one ply of a second fiber around the tensioned first fiber, wherein the second fiber forms a sheet and is electrically conductive;
- twisting the first fiber and the second fiber to produce a conductive elastic yarn; and
- coupling wires to both ends of the conductive elastic yarn,
- wherein the twisting the first fiber and the second fiber comprises:
  - performing at least one first rotation of a first end of the first fiber and a corresponding first end of the second fiber relative to a second end of the first fiber and a corresponding second end of the second fiber;
  - applying a densification solution to the rotated first and second fibers, wherein the densification solution comprises ethanol;
  - waiting a drying time to allow the applied densification solution to dry; and
  - performing a second rotation of the first end of the first fiber and the corresponding first end of the densified second fiber relative to the second end of the first fiber and the corresponding second end of the densified second fiber.

2. The method of claim 1, further comprising, during the second rotation, moving the first ends of the first and second fibers toward the second ends of the first and second fibers.

3. The method of claim 2, wherein the moving is at a speed determined based on at least one of:
- a rotation speed of the first ends of the first and second fibers,
- a number of plies of the second fiber arranged around the first fiber, or
- a total number of rotations of the first rotation and the second rotation.

4. The method of claim 1, wherein the coupling the wires comprises,
- mechanically connecting the conductive elastic yarn and the wires; and
- electrically connecting the conductive elastic yarn and the wires using a conductive paste.

5. The method of claim 4, wherein the coupling the wires further comprises heat-treating the conductive paste electrically connecting the conductive elastic yarn and the wires.

6. The method of claim 1, further comprising selecting a number of plies of the second fiber to be arranged around the tensioned first fiber based on an electrical resistance value corresponding to:
- a strain value, and
- a number of plies of the second fiber.

* * * * *